(12) United States Patent
Vasquez et al.

(10) Patent No.: US 7,236,087 B2
(45) Date of Patent: Jun. 26, 2007

(54) ON-PREMISES PAGER AND CHARGING UNIT, AND METHODS FOR USING SAME

(75) Inventors: Robert L. Vasquez, Stuart, FL (US); Richard C. Hoo, Sunrise, FL (US)

(73) Assignee: JTech Communications, Inc., Boca Raton, FL (US)

( * ) Notice: Subject to any disclaimer, the term of this patent is extended or adjusted under 35 U.S.C. 154(b) by 195 days.

(21) Appl. No.: 10/845,830

(22) Filed: May 14, 2004

(65) Prior Publication Data

US 2004/0227617 A1    Nov. 18, 2004

Related U.S. Application Data

(60) Provisional application No. 60/471,162, filed on May 16, 2003.

(51) Int. Cl.
   *G08B 3/00* (2006.01)

(52) U.S. Cl. ............. 340/311.2; 340/7.6; 340/539.11; 320/130

(58) Field of Classification Search ............ 340/311.2, 340/286.09, 7.58, 7.6, 7.61, 7.62, 539.11, 340/539.15, 286.07, 741; 320/130, 139, 320/155, 160
See application file for complete search history.

(56) References Cited

U.S. PATENT DOCUMENTS

| | | | | |
|---|---|---|---|---|
| 3,696,283 A | * | 10/1972 | Ackley, III | ................. 320/110 |
| 5,272,474 A | * | 12/1993 | Hilliard | ................. 340/825.29 |
| 5,325,040 A | * | 6/1994 | Bogut et al. | ................ 320/150 |
| 5,623,196 A | * | 4/1997 | Fernandez et al. | .......... 320/153 |
| 5,696,500 A | | 12/1997 | Diem | |
| 5,814,968 A | * | 9/1998 | Lovegreen et al. | ......... 320/113 |
| 5,999,088 A | * | 12/1999 | Sibbitt | ....................... 340/7.55 |
| 6,040,681 A | * | 3/2000 | May | ........................... 320/113 |
| 6,091,956 A | * | 7/2000 | Hollenberg | ............... 455/456.5 |
| 6,194,867 B1 | * | 2/2001 | Cummings et al. | ......... 320/119 |
| 6,366,196 B1 | * | 4/2002 | Green et al. | ........... 340/286.09 |
| 6,542,751 B1 | | 4/2003 | Blink et al. | |
| 6,573,824 B1 | * | 6/2003 | Lovegreen et al. | .......... 340/7.1 |

(Continued)

OTHER PUBLICATIONS

"We've Started A Revolution," Brochure; JTECH Communications, Inc.; 8 pages (1999).

*Primary Examiner*—Jeffery Hofsass
*Assistant Examiner*—Edny Labbees
(74) *Attorney, Agent, or Firm*—Morgan, Lewis & Bockius LLP

(57) ABSTRACT

On-premises pager loss is reduced by alerting patrons they are out of range. Pagers include an LCD with messages or promotions. An LED on the pager emits different colors indicating the level of battery charge. Circuitry in the pager causes a higher charge to be delivered to the battery when the pager is first coupled to a charging unit, and a lower charge to be delivered thereafter. Stacked slots in the charging unit receive the pagers. This permits access without disconnection of pagers in other slots and removal from the slots using first-in-first-out rotation. Charging rails on the charging unit simultaneously and directly connect each pager in the slots. Charging units are electrically coupled to other units in a daisy chain. A light on the unit indicates whether it is receiving power. Conductors on the pagers mechanically interlock with the charging rail when a pager is inserted into a slot.

3 Claims, 12 Drawing Sheets

U.S. PATENT DOCUMENTS

| | | |
|---|---|---|
| 6,712,278 B2 * | 3/2004 | Livingston et al. .......... 235/492 |
| 6,828,759 B1 * | 12/2004 | Xiong et al. ................. 320/116 |
| 6,950,019 B2 * | 9/2005 | Bellone et al. ......... 340/539.11 |
| 6,960,988 B2 * | 11/2005 | Blink et al. ............ 340/286.09 |
| 7,062,281 B2 * | 6/2006 | Blink et al. ................. 455/458 |
| 2002/0105412 A1 * | 8/2002 | Carissimo .................. 340/7.39 |
| 2003/0213840 A1 | 11/2003 | Livingston et al. |

* cited by examiner

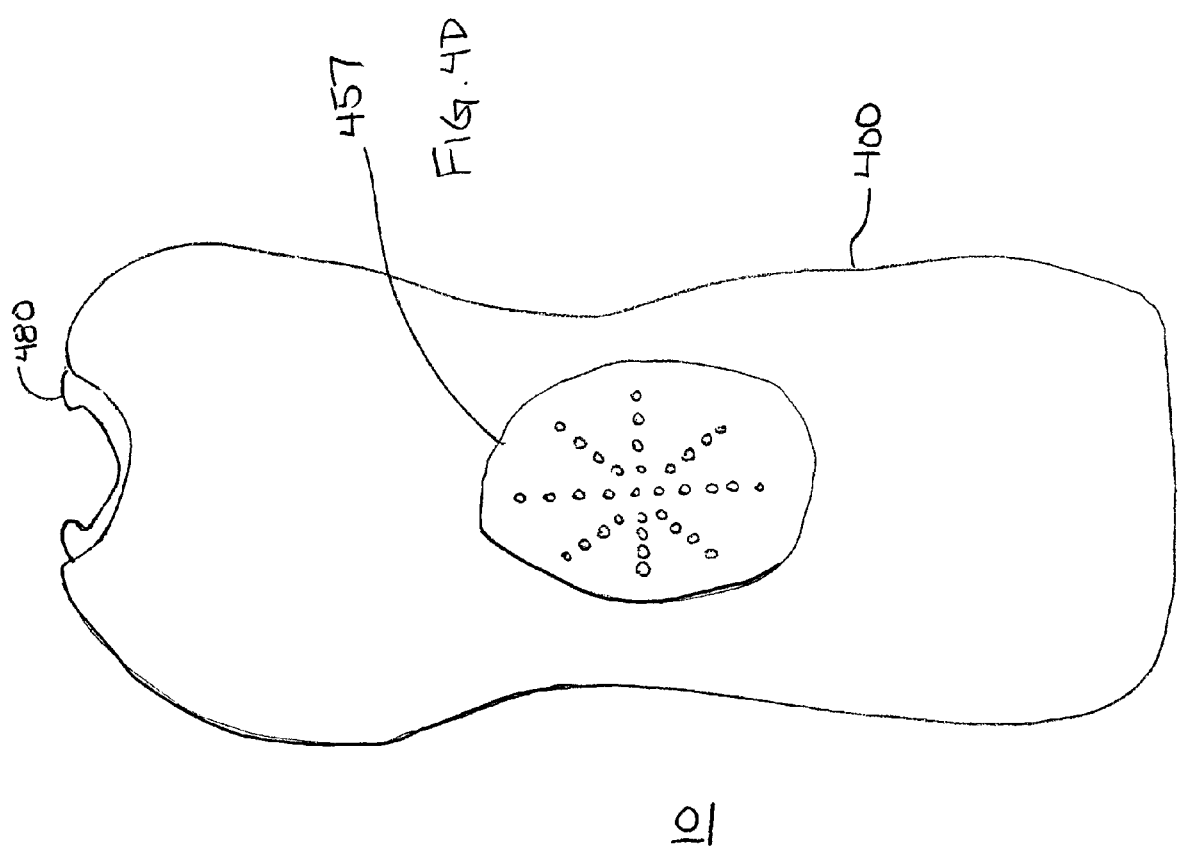

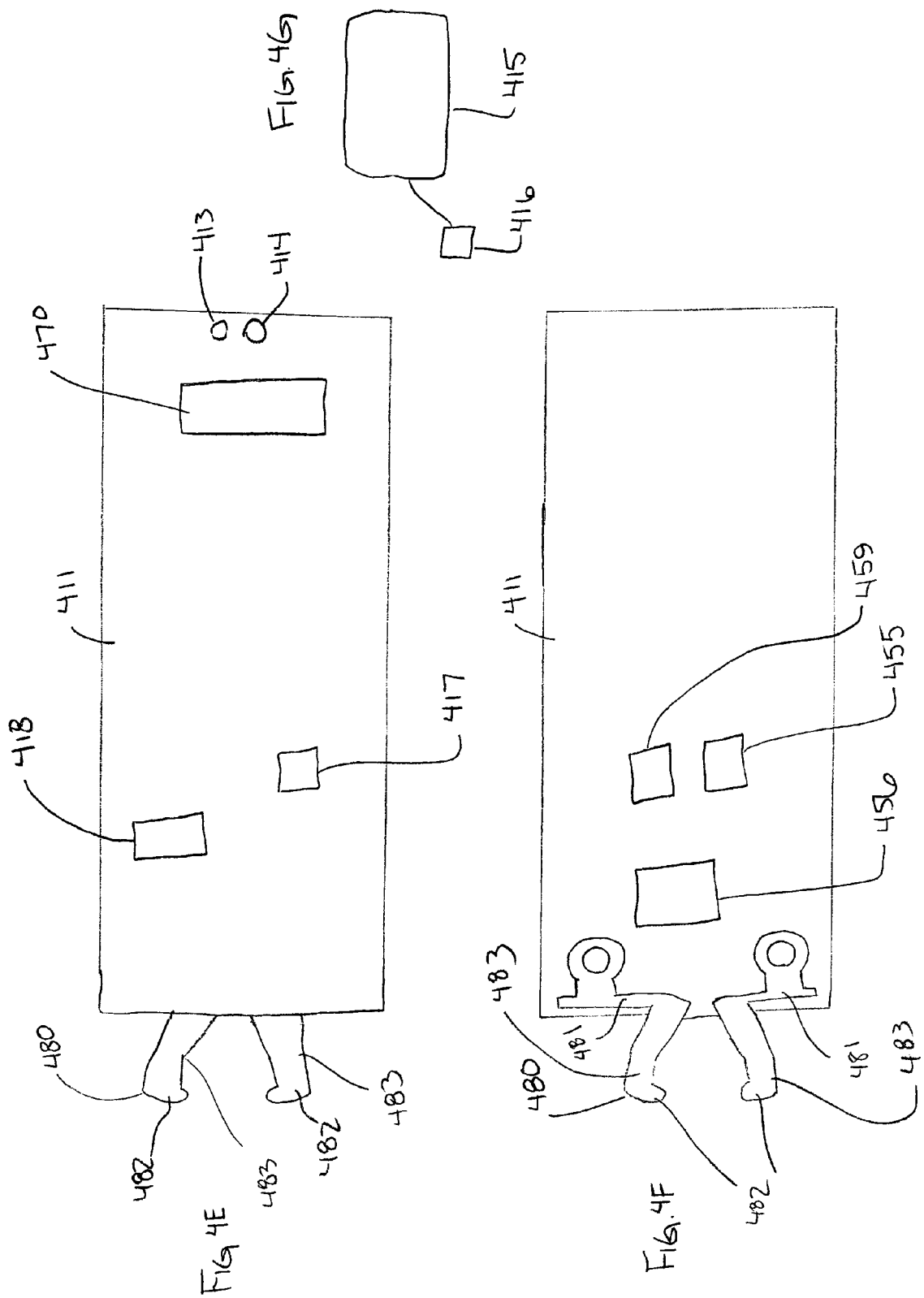

ON-PREMISES PAGER AND CHARGING UNIT, AND METHODS FOR USING SAME

CROSS-REFERENCE TO RELATED APPLICATIONS

The present application claims priority to U.S. Provisional Patent Application No. 60/471,162, filed May 16, 2003, entitled "Improved Coaster-Paging System," the contents of which is hereby incorporated herein in its entirety by reference.

BACKGROUND OF THE INVENTION

On-premises paging systems are widely known and used, but their use to date has been very limited. In particular, pagers of this sort are currently used predominantly in the restaurant industry to inform patrons when their table is ready. In addition, there exist a variety of problems associated with prior art pagers and their use. For example, restaurant patrons who travel out of range of the paging transmittal signal, and thus never get paged by the restaurant, may become annoyed and leave with the pagers, thereby resulting in pager loss. Further, pagers require frequent recharging. There is a need for paging systems with features designed to make recharging pagers faster, more efficient, and more convenient for individuals dispensing pagers to patrons.

SUMMARY OF THE INVENTION

The present invention is directed to novel on-premises paging and charging systems, and new methods for using on-premises paging systems.

In accordance with one aspect, the present invention is directed to a method for reducing loss by a restaurant of on-premises pagers provided to patrons of the restaurant. A plurality of on-premises pagers are provided to patrons of the restaurant in order to selectively alert patrons about table availability. Each pager selectively alerts a patron holding the pager about table availability in response to an activation signal addressed to the pager from a transmitter in the restaurant. In order to reduce loss of the pager by the restaurant, each pager selectively alerts the patron holding the pager that the patron is out of range of the transmitter by playing a voice message indicating an out of range condition when the pager is unable to receive the activation signal. The voice message indicating the out of range condition causes a patron that has left the restaurant with the pager to return to the restaurant where the pager is retrieved from the patron.

In accordance with a further aspect, the present invention is directed to an on-premises pager system for alerting patrons of a business that the business is ready to provide a good or service. A plurality of on-premises pagers are provided to patrons of the business after the patrons arrive at a geographic location of the business. A transmitter, located at the geographic location of the business, selectively alerts a patron holding a pager by addressing an activation signal to the pager. The activation signal causes the pager to play a voice message indicating that the business is ready to provide a good or service to the patron. The voice message played by the pager is a voice message indicating that the business is prepared to provide medical services to the patron, a voice message indicating that a retail order placed by the patron is ready for pick-up, a voice message indicating that an automobile is ready for pick up at an automobile service center, a voice message indicating that an automobile is ready for pick up at a car wash, a voice message indicating that food is ready for pick up at a counter, a voice message indicating that the prescription is ready for pick up at a pharmacy, a voice message indicating that a salon specialist is ready to provide salon services, or a voice message indicating that a sales specialist is ready to see a shopper in a retail store.

In accordance with a still further aspect, the present invention is directed to a method for providing on-premises pagers with different customized voice-messages to business customers. A voice message is identified for a business customer. The voice message identified for the business customer is then downloaded onto a plurality of voice message chips in order to generate a plurality of on-premises pagers for the business customer, wherein each of the on-premises pagers automatically plays the voice message for the business customer to a patron of the business customer in response to an activation signal addressed to the pager. The process is repeated for a plurality of different business customers each of which is identified with a different voice message.

The present invention also includes a novel on-premises paging system that employs a plurality of on-premises pagers each of which has a liquid crystal display (LCD) positioned on an outside surface of the pager housing. The LCD displays messages or promotions to a patron. A transmitter is located at a geographic location of the business. In response to an activation signal addressed to one of the pagers from the transmitter, the pager selectively alerts a patron holding the pager that the business is ready to provide a good or service to the patron. In response to a message display signal addressed to at least one of the pagers from the transmitter, the pager displays information from the message display signal on the LCD.

The present invention also includes a novel on-premises pager system that uses color to communicate the charge level of a battery in a pager. The system includes a plurality of on-premises pagers. At least one light emitting diode (LED) that emits a first color and a second color that is different from the first color is positioned within the pager housing adjacent to a transparent window on the surface of the housing. The housing for each pager also holds a re-chargeable battery for powering the pager. A transmitter, located at a geographic location of a business, provides activation signals to the pagers. In response to an activation signal addressed to one of the pagers from the transmitter, the pager selectively alerts a patron holding the pager that the business is ready to provide a good or service to the patron. In addition, for each pager, the at least one LED is activated to emit the first color if the re-chargeable battery has a charge above a threshold and the at least one LED is activated to emit the second color if the re-chargeable battery has a charge below the threshold. The at least one LED can be a single bi-color LED or multiple LEDs which each emit a different color.

In accordance with a still further aspect, the present invention includes an on-premises pager system with a rapid charge feature that expedites recharging of on-premises pagers. The system includes a transmitter located at a geographic location of the business, wherein, in response to an activation signal addressed to one of the pagers from the transmitter, the pager selectively alerts a patron holding the pager that the business is ready to provide a good or service to the patron. A charging unit that recharges batteries within the pagers is also provided. Each pager includes circuitry that causes a relatively higher charge to be delivered to the battery in the pager for a predetermined period of time after the pager is coupled to the charging unit, and the circuitry causes a relatively lower charge to be delivered to the battery in the pager after expiration of the predetermined period of time.

The present invention also provides a method for first-in-first-out (FIFO) rotation of on-premises pagers during charging of the pagers. The system includes a transmitter located at a geographic location of the business, wherein, in response to an activation signal addressed to one of the pagers from the transmitter, the pager selectively alerts a patron holding the pager that the business is ready to provide a good or service to the patron. A charging unit that recharges batteries within the pagers is also provided. The charging unit includes a plurality of stacked slots each of which holds one of the pagers during charging, and each stacked slot permits access by an operator to a pager positioned in the slot without disconnection of on-premises pagers in other slots from the charging unit. An operator inserts the on-premises pagers into the stacked slots and removes the on-premises pagers from the stacked slots in accordance with a FIFO rotation or in accordance with a level of charge of the pagers.

The present invention also includes an on-premises pager charging system with a charging rail that directly connects to multiple pagers at the same time. The system includes a plurality of on-premises pagers, and a transmitter located at a geographic location of a business. In response to an activation signal addressed to one of the pagers from the transmitter, the pager selectively alerts a patron holding the pager that the business is ready to provide a good or service to the patron. The system also includes a charging unit that recharges batteries within the pagers, wherein the charging unit includes a plurality of stacked slots each of which holds one of the pagers during charging. The charging unit includes a charging rail that simultaneously connects directly to each of the pagers in the stacked slots, and each stacked slot permits access by an operator to a pager positioned in the slot without disconnection of on-line pagers in other slots from the charging unit.

In one embodiment, each on-premises pager held in the charging unit includes a pair of conductors that mechanically interlock with the charging rail in the charging unit when the pager is inserted into one of the slots.

In a further embodiment, two or more of the charging units can be connected in a daisy chain such that multiple charging units may be powered from a single wall outlet, and each charging unit has a light, visible to an operator, that indicates whether the charging unit is receiving power.

BRIEF DESCRIPTION OF THE DRAWINGS

Throughout the drawings, like numerals are used to designate the same elements.

FIG. 4D illustrates a bottom view of an exemplary pager;

FIG. 4E illustrates a top view of an exemplary circuit board used within a pager;

FIG. 4F illustrates a bottom view of an exemplary circuit board used within a pager;

FIG. 4G illustrates a re-chargeable battery system that may be used in connection with a pager;

DETAILED DESCRIPTION OF THE PREFERRED EMBODIMENTS

Figure 1:
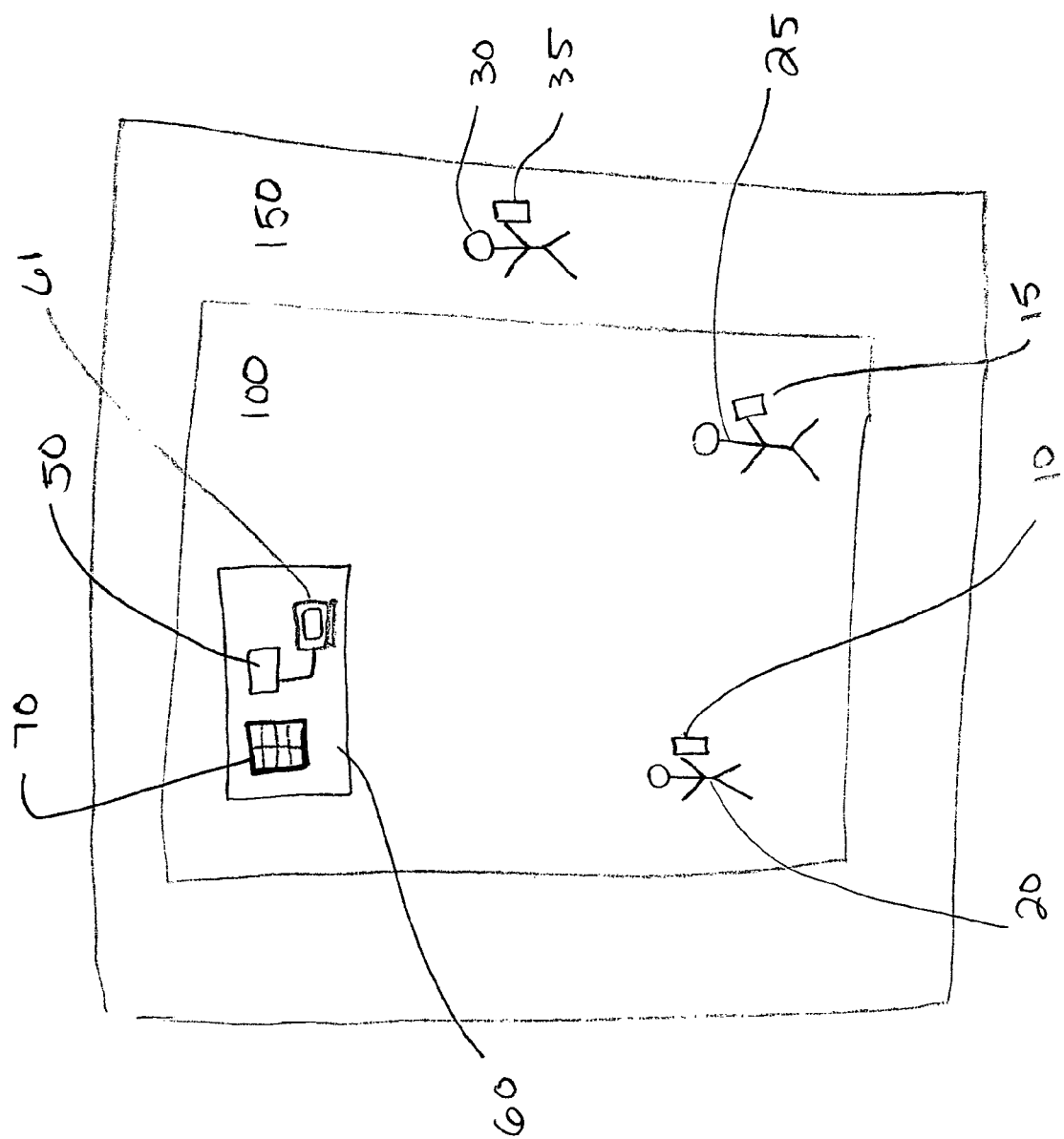
FIG. 1 illustrates the layout of an exemplary premises where the paging systems of the present invention may be used.

With reference to FIG. 1, an exemplary layout of premises 100 that may use the present invention is shown. In accordance with the present invention, premises 100 is a business that would have use for an on-premises pager system for alerting patrons of the business that the business is ready to provide a good or service. A plurality of on-premises pagers such as pagers 10, 15 (described in more detail with reference to FIGS. 4A-4G) are provided to patrons of the business 20, 25 upon their arrival. In a preferred embodiment, pagers are maintained at station 60 in a charging unit 70 (described in more detail with reference to FIGS. 5A and 5B). A host/hostess, or other person affiliated with the business, inputs the number associated with the pager and the name of the patron receiving the pager using personal computer 61. A transmitter 50, located at the geographic location of the business, and preferably in proximity to station 60, selectively alerts a patron 20, 25 holding a pager 10, 15 by addressing an activation signal to the pager. The activation signal causes the pager to play a voice message (accomplished by way of a voice chip in the pager, described in more detail with reference to FIG. 4F), or causes the pager to vibrate and flash (accomplished by way of a vibration motor and LEDs in the pager, described in more detail with reference to FIG. 4E) indicating that the business is ready to provide a good or service to the patron.

Referring still to FIG. 1, in another embodiment, premises 100 is a restaurant. In this embodiment, the present invention provides a method for reducing loss by the restaurant of on-premises pagers 10, 15 provided to patrons 20, 25 of the restaurant. Each of patrons 20, 25 are provided on-premises pagers 10, 15 in order to selectively alert patrons about table availability. Each pager 10, 15 selectively alerts a patron holding the pager about table availability in response to an activation signal addressed to the pager from a transmitter 50 in the restaurant. In order to reduce loss of the pager by the restaurant, each pager selectively alerts the patron holding the pager that the patron is out of range of the transmitter 50 (for example, in area 150) by playing a voice message indicating an out of range condition when the pager is unable to receive the activation signal. Thus, for example, patron 30 with pager 35 is in out of range area 150 and, thus, will receive a voice message indicating that he is out of range. The voice message indicating the out of range condition will then cause patron 30 to return to the premises 100 where the pager 35 is retrieved from the patron.

Figure 2:
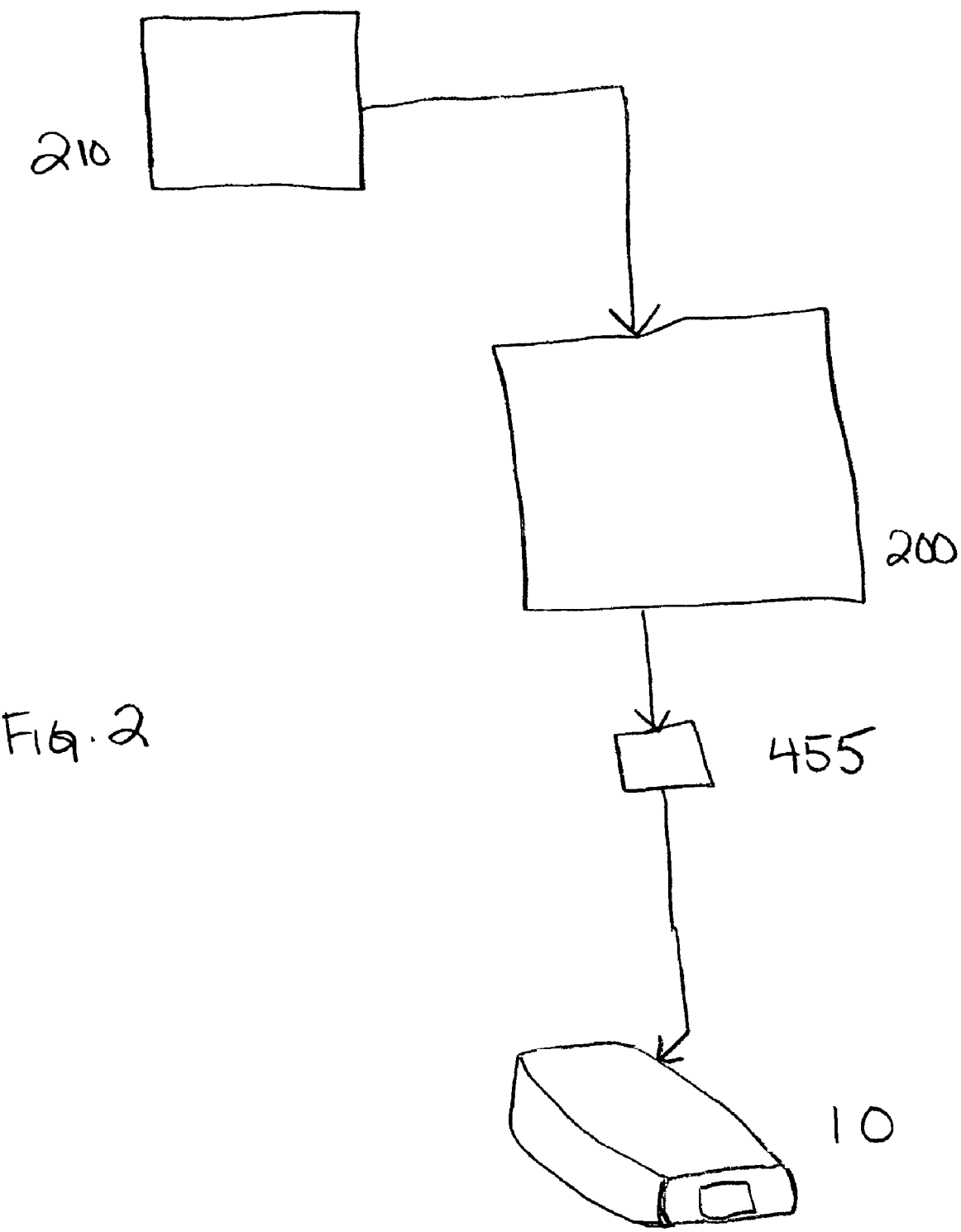
FIG. 2 illustrates a system for including customized voice messages on a pager in accordance with a preferred embodiment of the present invention.

In accordance with the present invention, business customers can be provided with the ability to include customized voice-messages on the pagers. With reference to FIG. 2, a pager customizing entity 200 receives a voice message from a business customer 210. For example, the voice message may be received as a .wav file on a disc. The voice file may remain on the disc or may be downloaded onto a computer system at pager customizing entity 200 until ready to be used. Alternatively, a file containing the voice message may be transmitted by business customer 210 to pager customizing entity 200 over a network, such as the Internet, and maintained on a server or other computer system. In still a further embodiment, pager customizing entity 200 creates the voice message under the direction of business customer 210.

In a preferred embodiment, the voice file is associated with a part number. When a business customer 210 orders one or more pagers and specifies the part number associated with a particular voice file, the voice file is then downloaded onto a voice message chip 455. The voice message chip 455 is included in the one or more pagers ordered by the business customer 210 as shown in FIG. 4F. The on-premises pagers generated in this manner for the business customer 210 automatically play the voice message received from the business customer 210 to a patron of the business customer in response to an activation signal addressed to the pager (as described with reference to FIG. 1). The process is repeated for a plurality of different business customers 210, each of which provides, or is identified with, a different voice message.

In some cases, personal computer 61 may have stored on it customized voice files (e.g., in .wav format). The host/hostess at station 60 may select, using menu options displayed on the monitor of personal computer 61, the particular voice file it wants to transmit to one of pager 10, 15. Such voice files may be customized in accordance with the wishes of business customer 210.

Figure 3:
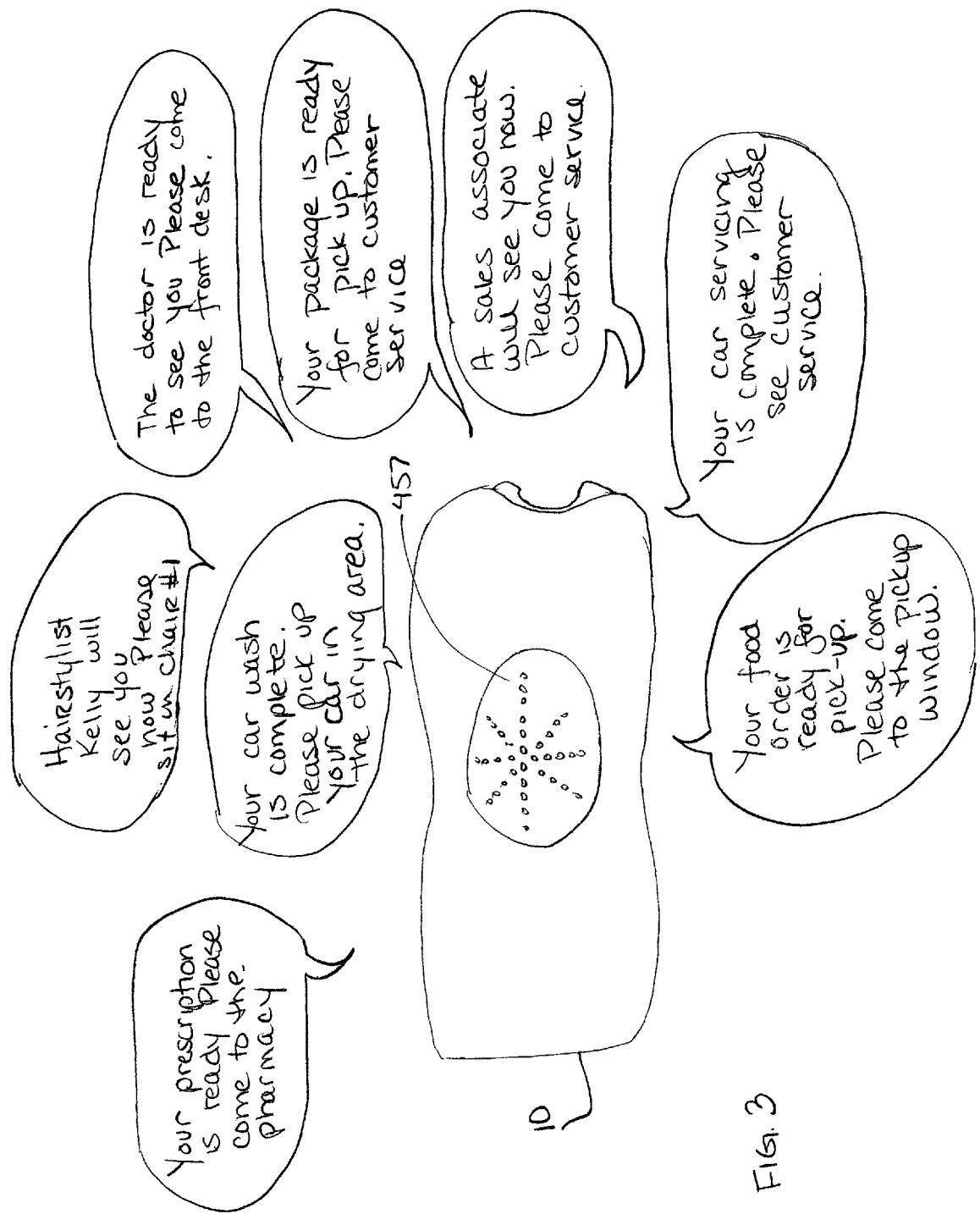
FIG. 3 illustrates a bottom view of a pager and exemplary, customized voice messages that may be emitted therefrom.

The ability to provide custom voice messages on pagers allows for a wide range of novel applications of on-premises paging systems. For example, in accordance with the present invention, premises 100 of FIG. 1 may be a medical services business, such as a doctor's office or hospital. With reference to FIG. 3, in this embodiment, the voice message played by the pager 310 is a voice message indicating that the business is prepared to provide medical services to the patron. In another embodiment, premises 100 is a retail store, and the voice message indicates that a retail order placed by the patron is ready for pick-up or that a sales specialist is ready to see a shopper. In a further embodiment, premises 100 is a automobile service center, and the voice message indicates that an automobile is ready for pick up. In a further embodiment, premises 100 is a car wash, and the voice message indicates that an automobile is ready for pick up. In another embodiment, premises 100 is a food services establishment, and the voice message indicates that food is ready for pick up at a counter. In a further embodiment, premises 100 is a pharmacy, and the voice message indicates that a prescription is ready for pick up. In a still further embodiment, premises 100 is a salon, and the voice message indicates that a salon specialist is ready to provide salon services.

With reference to FIGS. 4A, 4B, 4C, 4D, 4E, 4F, and 4G, the various components of an exemplary on-premises pager, that may be used in connection with a preferred embodiment of the present invention, are shown.

Figure 4B:
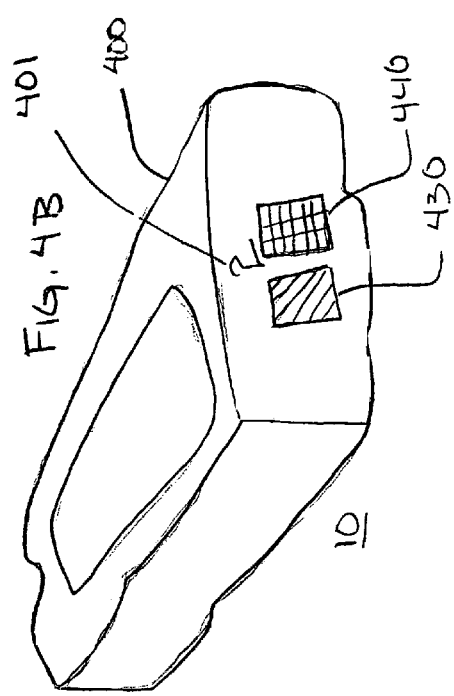
FIG. 4B illustrates a perspective view of an exemplary pager.
Figure 4C:
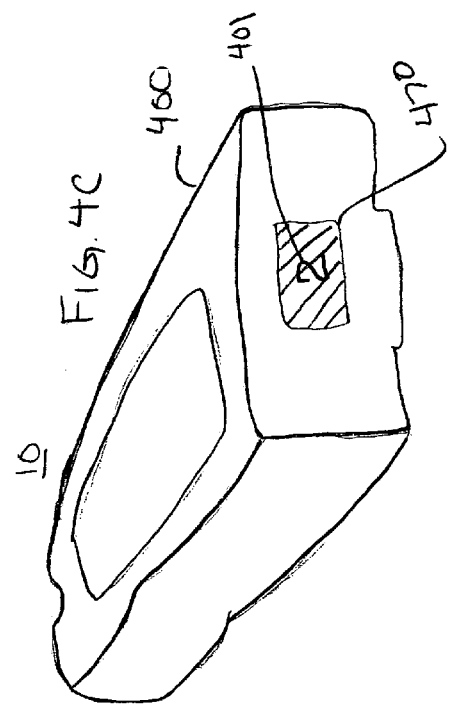
FIG. 4C illustrates a perspective view of an exemplary pager.
Figure 4A:
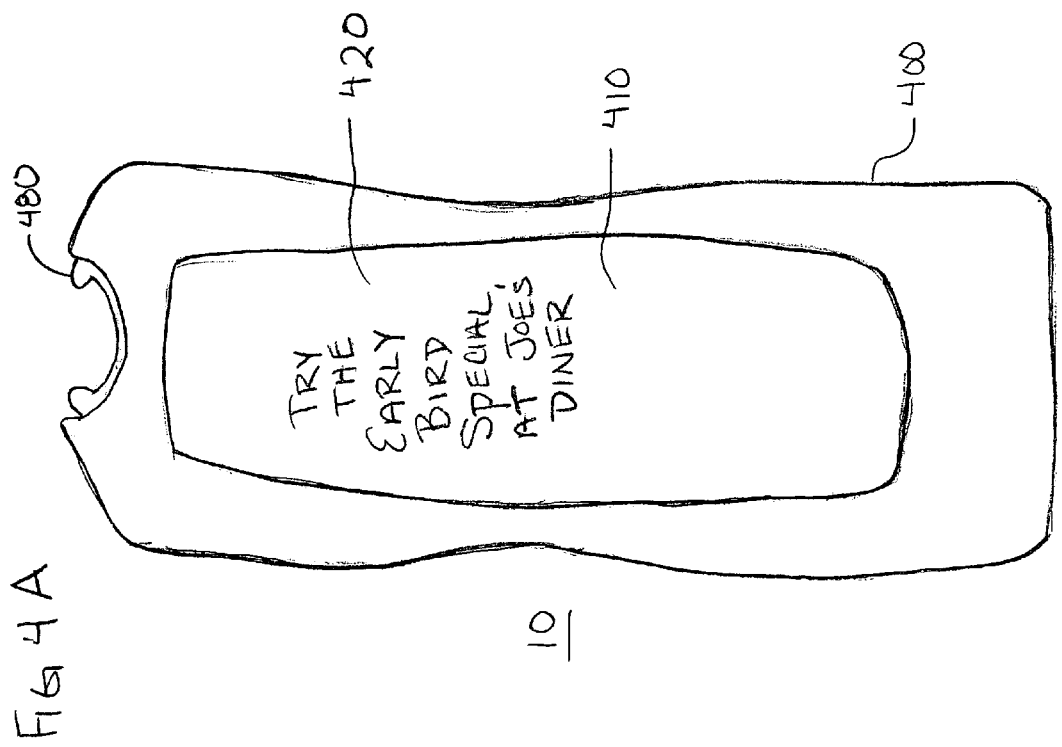
FIG. 4A illustrates a top view of an exemplary pager.

FIG. 4A illustrates a top view of the on-premises pager 10. Pager 10 includes a pager housing 400. The on-premises pagers may, in accordance with one embodiment of the present invention, include a liquid crystal display (LCD) 410 positioned on an outside surface of the pager housing 400. The LCD 410 displays messages or promotions to a patron. As described with reference to FIG. 1, a transmitter 50 is located at premises 100. In response to an activation signal addressed to pager 10 from the transmitter 50, the pager 10 selectively alerts a patron 20 holding the pager 10 that the business is ready to provide a good or service to the patron. In response to a message display signal addressed to the pager 10 from the transmitter 50, the pager 10 displays information, such as advertisement 420, from the message display signal on the LCD 410.

The present invention also includes a novel on-premises pager system that uses color to communicate the charge level of a battery in a pager. FIG. 4E shows a top view of board 411, which is positioned within pager housing 400 and which maintains the electronics used in connection with the on-premises pager. In the illustrated embodiment, board 411 includes two light emitting diodes (LED) 413 and 414 (each of which emits a different color) positioned within the pager housing 400 and adjacent to two transparent windows 430 and 440 on the surface of the pager housing 400, as shown in FIG. 4B. Housing 400 may include the pager number above the windows 430 and 440 for ease of identification of the pager. In the example shown in FIG. 4B, the colors of the diodes are green and yellow. Other colors may be used within the scope of the present invention.

Each pager includes a re-chargeable battery 415, shown in FIG. 4G. Attached to re-chargeable battery 415 is a battery jack 416 which, in use, is inserted within battery connector 417 on board 411 of FIG. 4E. Vibration motor 418 receives power from re-chargeable battery 415. Re-chargeable battery 415 is maintained in a convenient location on the pager housing 400, for example, behind removable LCD 410.

LED 414 is activated to emit the first color (in this case, green) if the re-chargeable battery 415 has a charge above a threshold and LED 413 is activated to emit the second color (in this case, yellow) if the re-chargeable battery has a charge below the threshold.

In an alternate embodiment, a single bi-color LED is used. In this embodiment, housing 460 of FIG. 4C includes only one transparent window 470 on its surface and board 411 of FIG. 4E includes only one LED 413 or 414. In this embodiment, the pager number 401 may be included directly on the transparent window 470, as opposed to above the windows, as shown in FIG. 4B. As with the previously described embodiment, the LED is activated to emit the first color if the re-chargeable battery 415 has a charge above a threshold and a second color if the re-chargeable battery 415 has a charge below the threshold.

As shown in FIG. 4E, an antennae 470 is included on board 411 to receive signals from transmitter 50.

Referring again to FIG. 4F, showing a bottom view of board 411, also positioned on board 411 is a CPU 456 and one or more voice chips 455 and 459. A standard version of pager 10 may include one voice chip 455, whereas a version of pager 10 that includes a customized voice message may include an additional voice chip 459. Held in place by the bottom portion of pager housing 400 (shown in FIG. 4D) is a speaker (not shown), which is electronically connected to voice chips 455 and/or 459 and is used to emit sounds stored thereon. Referring to FIG. 4D, a bottom view of the pager housing 400 is shown, which includes speaker cover portion 457.

Figure 5A:
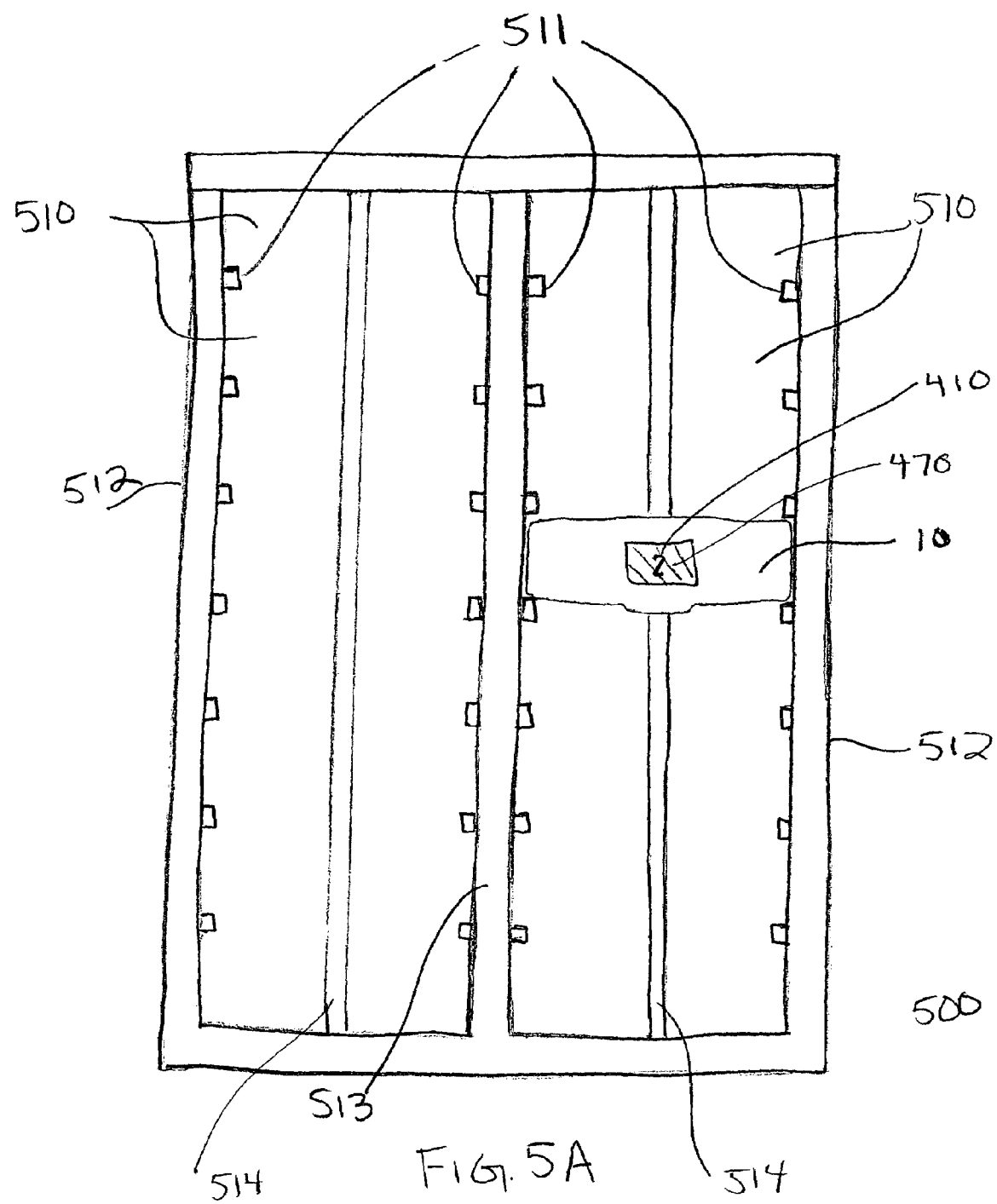
FIG. 5A illustrates a front view of an exemplary charging unit.
Figure 5B:
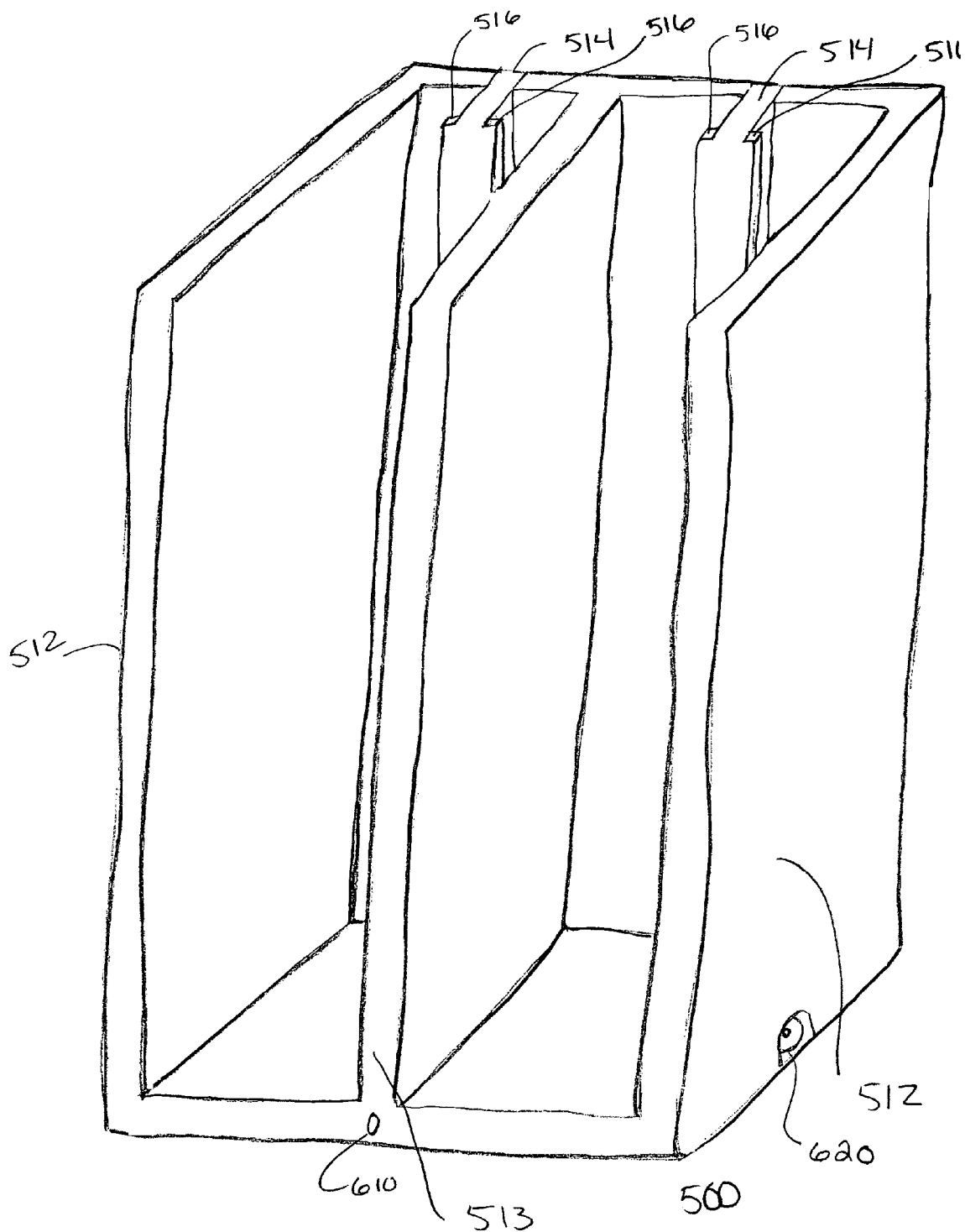
FIG. 5B illustrates a perspective view of an exemplary charging unit.

The present invention also includes a rapid charge feature that expedites recharging of on-premises pagers. FIG. 5A illustrates a front view of charging unit 500. Charging unit 500 includes multiple stacked slots created by pairs of holders 511 connected to each side wall 512 of charging unit 500 and internal wall 513. A pager 10 fits within one of slots 5 10, with window 470, including the pager number 401, facing outward. FIG. 5B illustrates a perspective view of charging unit 500 with the top and holders 511 removed to allow for a more simplified view of the structure of charging unit 500. Charging unit 500 recharges batteries, such as re-chargeable batteries 415 of FIG. 4G when connected to battery connector 417 and maintained within pager 10. Each pager 10 includes circuitry in a quick charge circuit, bypassing limiting resistors, that causes a relatively higher charge to be delivered to the batteries 415 for a predetermined period of time after the pager 10 is coupled to the charging unit 500, and the circuitry causes a relatively lower charge to be delivered to the batteries 415 in the pager 10 after expiration of the predetermined period of time.

The present invention also provides for first-in-first-out (FIFO) rotation of pagers during charging of the pagers. The stacked slots 510 of charging unit 500 permit access by an operator to a pager 10 positioned in the slot 510 without disconnection of on-premises pagers in other slots 510 from the charging unit 500. An operator inserts the on-premises pagers 10 into the stacked slots 510 and removes the on-premises pagers 10 from the stacked slots in accordance with a FIFO rotation. Alternatively, the on-premises pagers 10 may be removed from the stacked slots in accordance with the level of charge of the pagers (i.e., pagers with a green light indicating a full charge are removed first).

The charging unit 500 also includes one or more charging rails 514, as shown in both FIGS. 5A and 5B, which directly connect to multiple pagers at the same time. Charging rails include flanges 516 to allow for mechanical interlocking with conductors 480, as described in more detail below. Each charging rail 514 simultaneously connects directly to each of the pagers 10 in the stacked slots 510, and each stacked slot 510 permits access by an operator to a pager positioned in the slot 510 without disconnection of on-line pagers in other slots 510 from the charging unit.

In one embodiment, each on-premises pager held in the charging unit includes a pair of conductors that mechanically interlock with the charging rail in the charging unit when the pager is inserted into one of the slots. For example, as shown in FIGS. 4A, 4D, 4G, and 4F, pager 10 includes conductors 480 which serve both to conduct electricity from charging rail 514 of charging unit 512 to recharge the batteries within pager 10, and to interlock with charging rail 514 mechanically. In a preferred embodiment, arms 481 and bodies 483 of conductors 480 are flexible such that when hooks 482 of conductors 480 are forced against a charging rail 514 of charging unit 512, the arms 481 and bodies 483 of conductor 280 are flexed outward to accommodate flanges 516 of charging rail 514, and then snap back into place, fixing hooks 482 securely, though removably, around flanges 516.

Figure 6:
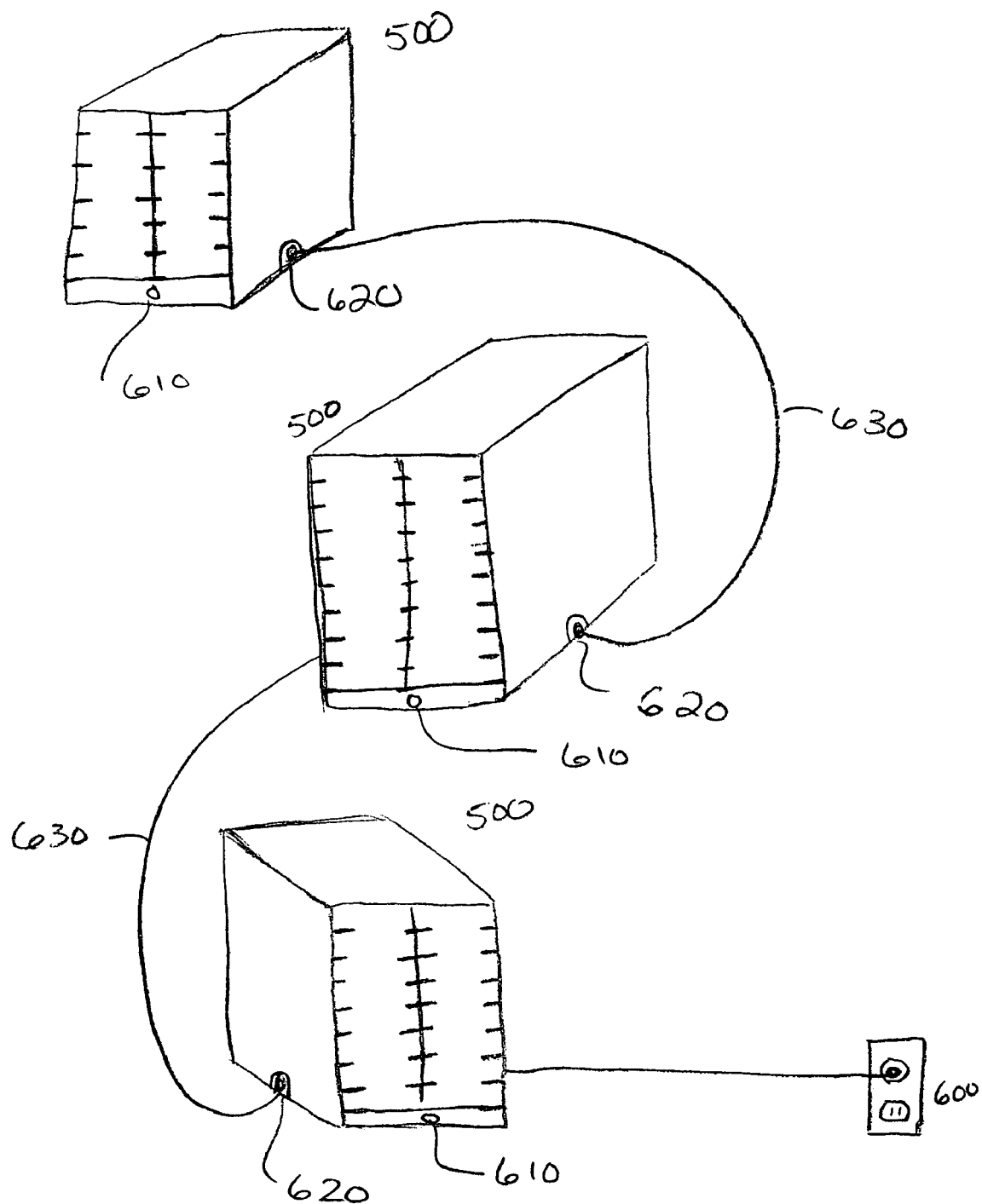
FIG. 6 illustrates multiple exemplary charging units electrically connected.

With reference to FIG. 6, showing a further aspect of the present invention, two or more of the charging units 500 can be connected in a daisy chain using cables 630 plugged into sockets 620 (one on each side of the charging unit 500) such that multiple charging units may be powered from a single wall outlet 600. Each charging unit has a light 610, visible to an operator, that indicates whether the charging unit is receiving power.

Figure 7:
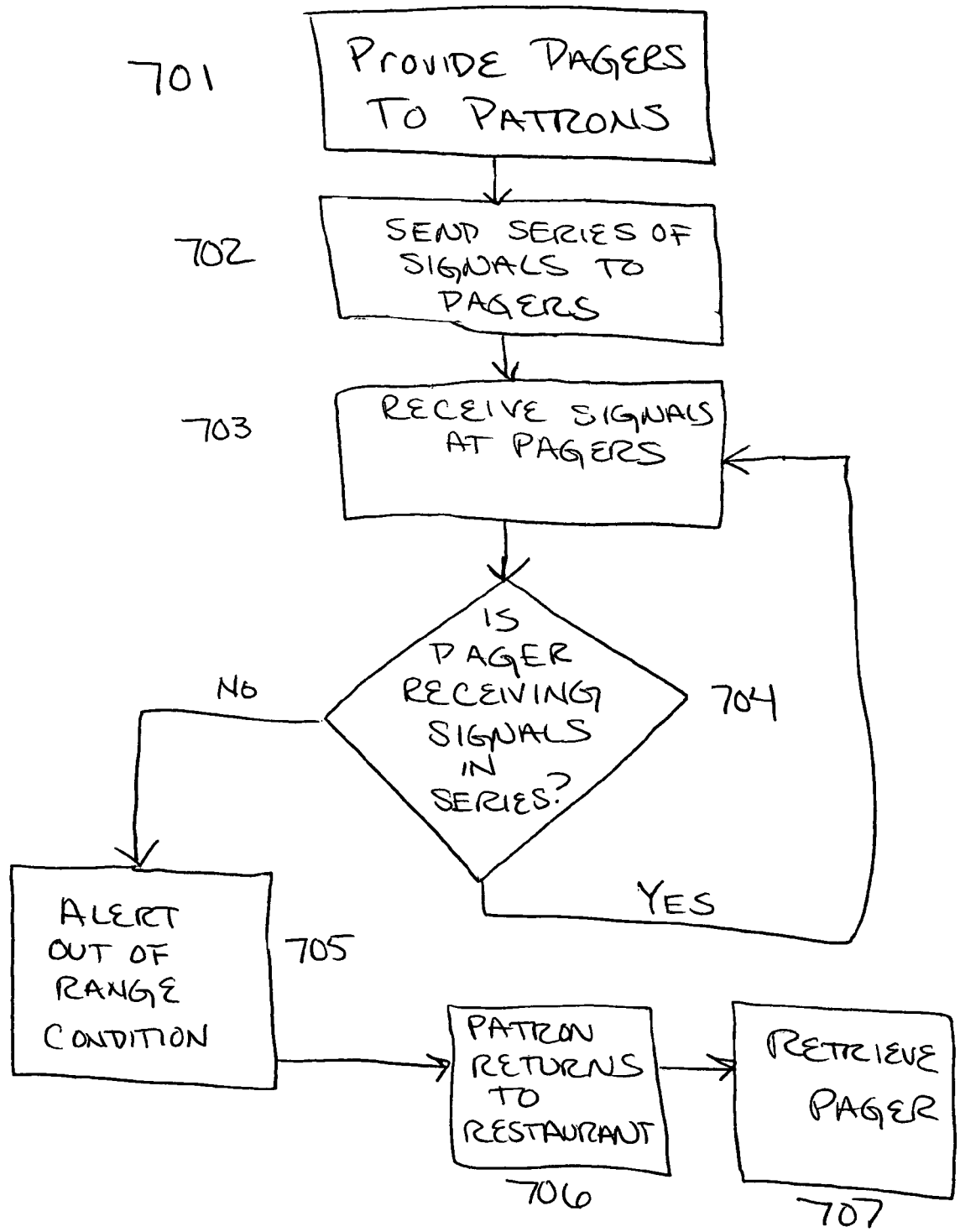
FIG. 7 is a flow chart illustrating a method for reducing loss by a restaurant of on-premises pagers provided to patrons of the restaurant.

With reference to FIG. 7, a method for reducing loss by a restaurant of on-premises pagers provided to patrons of the restaurant is illustrated. In step 701, a plurality of on-premises pagers are provided to patrons of the restaurant in order to selectively alert patrons about table availability, wherein each pager selectively alerts a patron holding the pager, for example by playing a voice message to the patron or vibrating and flashing, indicating table availability in response to an activation signal addressed to the pager from a transmitter in the restaurant. In step 702, the transmitter sends a series of signals to the pager and, in step 703, the signals are received at the pager. In step 704, it is determined whether the pager is able to receive one or more signals in the series. If not, in order to reduce loss of the pager by the restaurant, each pager selectively alerts the patron holding the pager that the patron is out of range of the transmitter by playing a voice message indicating an out of range condition, in step 705. Thus, by way of example, transmitter 50 may be configured to transmit a signal to pager 10 approximately every seven seconds. Once pager 10 receives one of these signals, it expects to continue to receive such signals, approximately every seven seconds. Pager 10 may be programmed such that, if it fails to receive a certain number of these signals within a certain time period, an out of range condition is indicated by the playing of a voice message such as "You are out of range and cannot receive the page".

In step 706, the patron returns to the restaurant in response to the voice message indicating the out of range condition. In step 707, the pager is retrieved from the patron.

Figure 8:
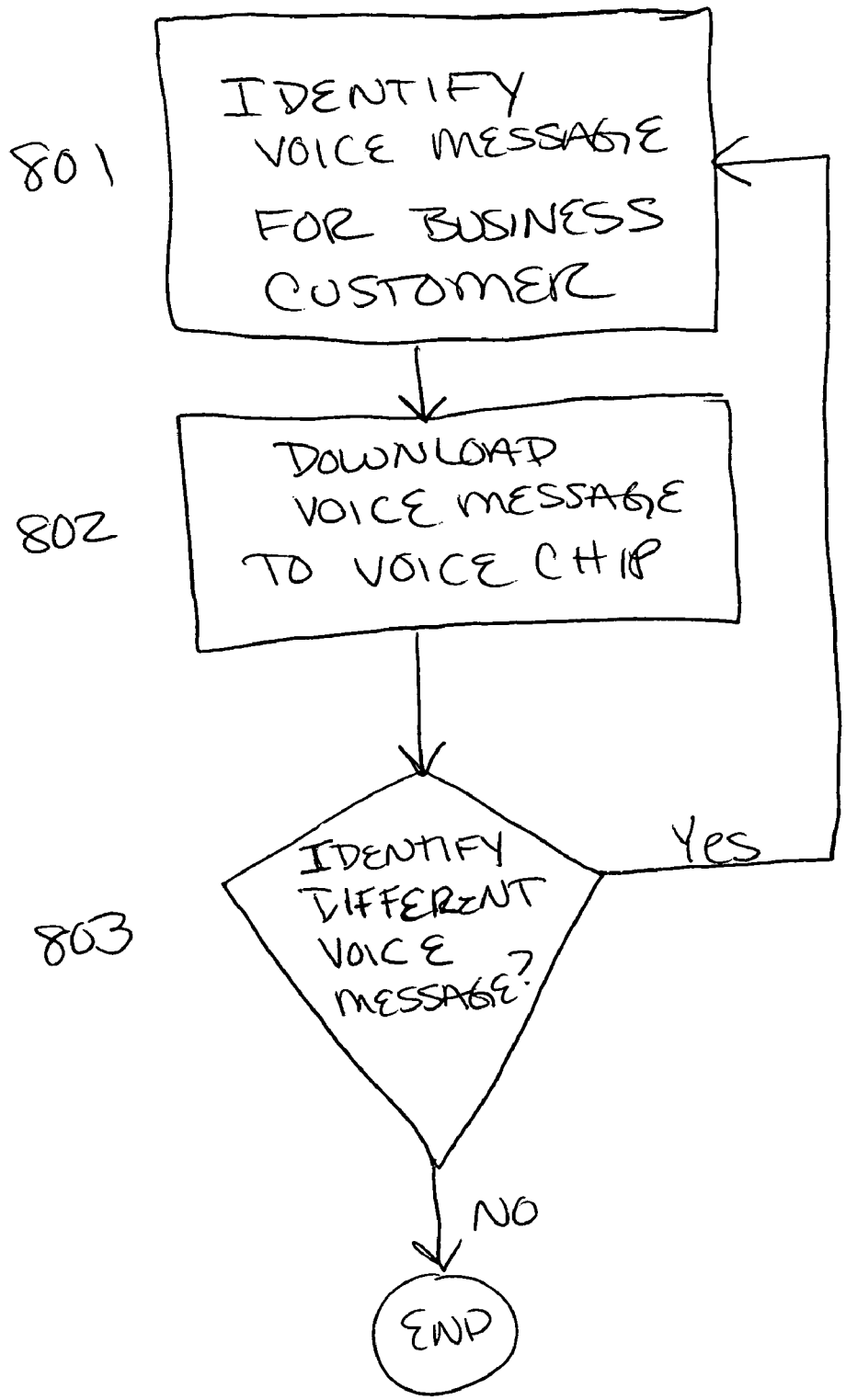
FIG. 8 is a flow chart illustrating a method for providing on-premises pagers with different customized voice-messages to business customers.

With reference to FIG. 8, a method for providing on-premises pagers with different customized voice-messages to business customers is illustrated. In step 801, a voice message is identified for a business customer. In step 802, the voice message is downloaded onto a plurality of voice message chips in order to generate a plurality of on-premises pagers for the business customer. Each of the on-premises pagers automatically plays the received voice message to a patron of the business customer in response to an activation signal addressed to the pager. In step 803, it is determined if a different voice message is identified for another business customer. If so, steps 801 and 802 are repeated.

Figure 9:
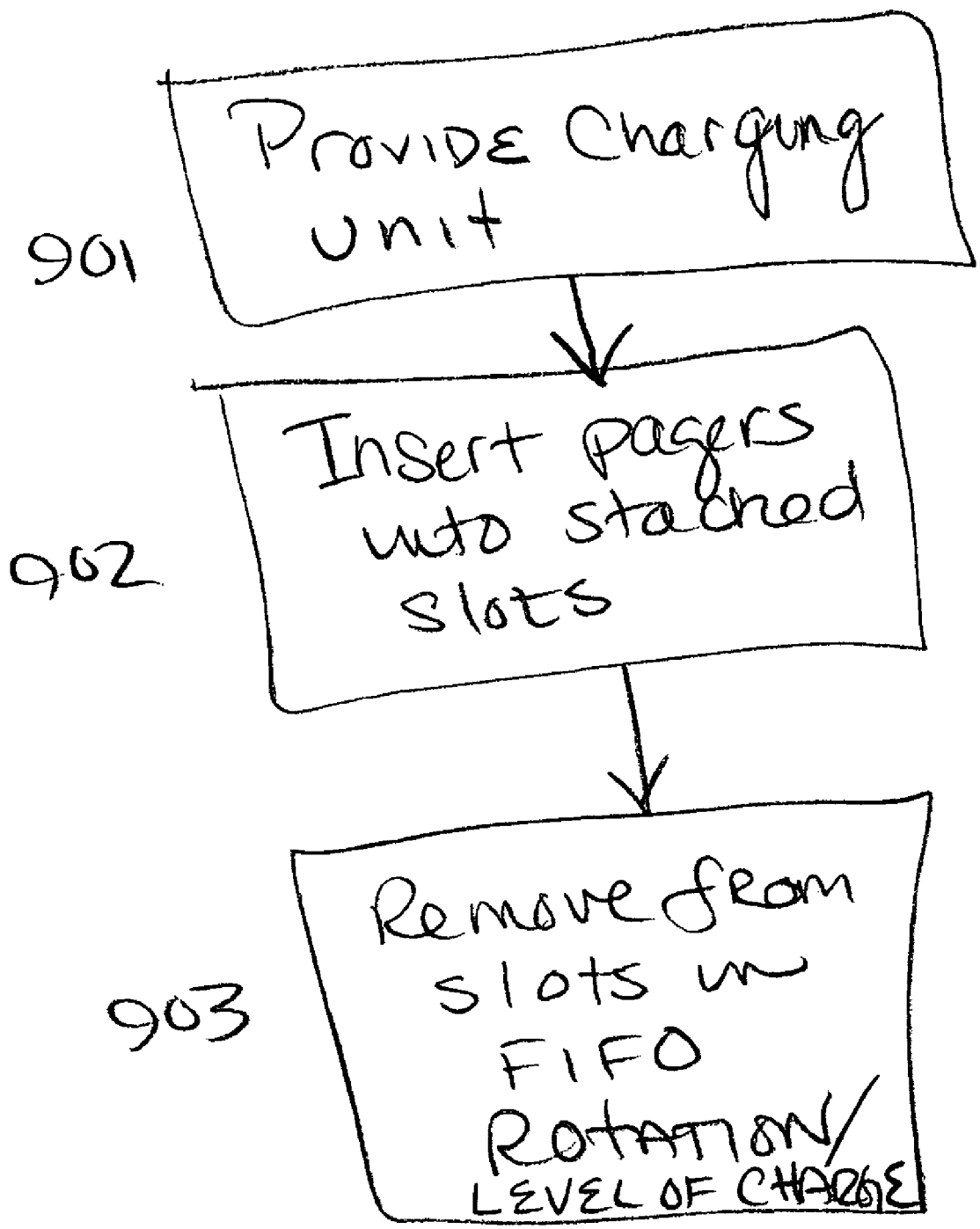
FIG. 9 is a flow chart illustrating a method for charging an on-premises pager in an on-premises pager system for alerting patrons of a business that the business is ready to provide a good or service.

With reference to FIG. 9, a method for charging an on-premises pager in an on-premises pager system for alerting patrons of a business that the business is ready to provide a good or service is illustrated. The system includes a plurality of the on-premises pagers, and a transmitter located at a geographic location of the business. In response to an activation signal addressed to one of the pagers from the transmitter, the pager selectively alerts a patron holding the pager that the business is ready to provide a good or service to the patron. In step 901, a charging unit that recharges batteries within the pagers is provided. The charging unit includes a plurality of stacked slots each of which holds one of the pagers during charging and permits access by an operator to a pager positioned in the slot without disconnection of on-premises pagers in other slots from the charging unit. In step 902, the on-premises pagers are inserted into the stacked slots and, in step 903, removed from the stacked slots in accordance with a first-in-first-out (FIFO) rotation or in accordance with a level of charge of the pagers.

It will be appreciated by those skilled in the art that changes could be made to the embodiments described above without departing from the broad inventive concept thereof.

It is understood, therefore, that this invention is not limited to the particular embodiments disclosed, but is intended to cover modifications within the spirit and scope of the present invention as defined in the appended claims.

What is claimed is:

1. In an on-premises pager system for alerting patrons of a business that the business is ready to provide a good or service, wherein the system includes a plurality of on-premises pagers, a transmitter located at a geographic location of the business, and wherein, in response to an activation signal addressed to one of the pagers from the transmitter, the pager selectively alerts a patron holding the pager that the business is ready to provide a good or service to the patron, a method for charging the on-premises pagers comprising:

providing a charging unit that recharges batteries within the pagers, wherein the charging unit includes a plurality of stacked slots each of which holds one of the pagers during charging, and wherein each stacked slot permits access by an operator to a pager positioned in the slot without disconnection of on-premises pagers in other slots from the charging unit; and inserting the on-premises pagers into the stacked slots and removing the on-premises pagers from the stacked slots in accordance with one or more of a first-in-first-out (FIFO) rotation; and a level of charge of the on-premises pagers.

2. In an on-premises pager system for alerting patrons of a business that the business is ready to provide a good or service, wherein the system includes a plurality of on-premises pagers, a transmitter located at a geographic location of the business, and wherein, in response to an activation signal addressed to one of the pagers from the transmitter, the pager selectively alerts a patron holding the pager that the business is ready to provide a good or service to the patron, a system for charging the on-premises pagers, comprising:

a charging unit that recharges batteries within the pagers, wherein the charging unit includes a plurality of stacked slots each of which holds one of the pagers during charging, and wherein the charging unit includes a charging rail that simultaneously connects directly to each of the pagers in the stacked slots; and wherein each stacked slot permits access by an operator to any pager positioned in any of the slots without disconnection of on-premises pagers in other slots from the charging unit.

3. The system of claim 2 wherein each pager includes a pair of conductors that mechanically interlock with the charging rail in the charging unit when the pager is inserted into one of the slots.

* * * * *